United States Patent
Bruns et al.

(10) Patent No.: US 12,261,903 B2
(45) Date of Patent: *Mar. 25, 2025

(54) PREVENTING DUPLICATIVE FILE PROCESSING

(71) Applicant: Capital One Services, LLC, McLean, VA (US)

(72) Inventors: Alec Bruns, Chicago, IL (US); Rajendra Mokshagundam, Elk Grove Village, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,949

(22) Filed: Feb. 16, 2024

(65) Prior Publication Data

US 2024/0195862 A1 Jun. 13, 2024

Related U.S. Application Data

(60) Division of application No. 17/804,122, filed on May 26, 2022, now Pat. No. 11,924,271, which is a continuation of application No. 17/447,484, filed on Sep. 13, 2021, now Pat. No. 11,368,515.

(51) Int. Cl.
| | |
|---|---|
| *G06F 15/16* | (2006.01) |
| *G06F 16/174* | (2019.01) |
| *H04L 67/06* | (2022.01) |
| *H04L 67/1097* | (2022.01) |
| *H04L 67/306* | (2022.01) |

(52) U.S. Cl.
CPC .......... *H04L 67/06* (2013.01); *G06F 16/1748* (2019.01); *H04L 67/1097* (2013.01); *H04L 67/306* (2013.01)

(58) Field of Classification Search
CPC ..... H04L 67/1095; H04L 67/01; H04L 67/06; G06F 16/1748
USPC .......................................... 709/203, 217, 226
See application file for complete search history.

(56) References Cited

U.S. PATENT DOCUMENTS

| | | | |
|---|---|---|---|
| 6,571,270 B1 * | 5/2003 | Lai .......................... | G06F 9/466 |
| | | | 718/101 |
| 7,464,867 B1 * | 12/2008 | Kolls ........................ | G06F 7/08 |
| | | | 235/449 |
| 11,368,515 B1 | 6/2022 | Bruns et al. | |
| 2005/0108476 A1 * | 5/2005 | Tanaka ................ | H04L 67/1097 |
| | | | 711/114 |
| 2006/0155705 A1 * | 7/2006 | Kamper .................. | G06F 16/10 |
| 2008/0162320 A1 * | 7/2008 | Mueller ............... | G06Q 20/108 |
| | | | 705/35 |
| 2008/0205655 A1 * | 8/2008 | Wilkins ................. | G06Q 10/10 |
| | | | 707/999.005 |

(Continued)

*Primary Examiner* — Liang Che A Wang
(74) *Attorney, Agent, or Firm* — Harrity & Harrity, LLP

(57) ABSTRACT

In some implementations, a device may determine whether an existing record for a file, received at a file storage location, is present in a record log. The device may generate, based on determining that the existing record for the file is not present in the record log, a record for the file in the record log. The record may identify the file and a first region. The device may determine, after generating the record, whether the record has been changed to identify a second region. The device may process the file based on determining that the record has not been changed to identify the second region.

20 Claims, 6 Drawing Sheets

(56) References Cited

U.S. PATENT DOCUMENTS

| | | | |
|---|---|---|---|
| 2011/0078112 A1* | 3/2011 | Takata | G06F 16/185 |
| | | | 709/219 |
| 2012/0011256 A1* | 1/2012 | Masuda | H04L 67/52 |
| | | | 709/227 |
| 2015/0281000 A1* | 10/2015 | Iyama | H04L 43/0817 |
| | | | 709/224 |
| 2016/0269329 A1* | 9/2016 | Willis | H04L 51/08 |
| 2016/0308812 A1* | 10/2016 | Johnstone | H04L 67/1097 |
| 2017/0024100 A1* | 1/2017 | Pieper | H04L 67/01 |
| 2019/0079499 A1* | 3/2019 | Yamamoto | G05B 19/41835 |
| 2019/0347667 A1* | 11/2019 | Zhang | G06Q 20/4012 |
| 2020/0051554 A1* | 2/2020 | Kim | G06F 3/167 |
| 2020/0372016 A1* | 11/2020 | Rogynskyy | H04L 67/1095 |
| 2023/0082068 A1 | 3/2023 | Bruns et al. | |

* cited by examiner

PREVENTING DUPLICATIVE FILE PROCESSING

RELATED APPLICATION

This application is a division of U.S. patent application Ser. No. 17/804,122, filed May 26, 2022, which is a continuation of U.S. patent application Ser. No. 17/447,484, filed Sep. 13, 2021 (now U.S. Pat. No. 11,368,515), the contents of which are incorporated herein by reference in their entireties.

BACKGROUND

A high-availability cluster may include multiple nodes (e.g., network devices) that are linked or connected to form a logical or virtual node that is more resilient to faults than if the multiple nodes were to operate in discrete configurations. The multiple nodes in the high-availability cluster may share information, such that faults in the high-availability cluster may be mitigated by near-instantaneous failover.

SUMMARY

Some implementations described herein relate to a system for preventing duplicative file processing. The system may include one or more memories and one or more processors communicatively coupled to the one or more memories. The one or more processors may be configured to receive, at a first file storage location associated with a first region, a file that is to be processed. The one or more processors may be configured to generate a first event item, associated with the file, in a first queue associated with the first file storage location based on receiving the file at the first file storage location. The one or more processors may be configured to obtain the first event item associated with the file from the first queue. The one or more processors may be configured to determine, based on obtaining the first event item from the first queue, whether an existing record for the file is present in a record log. The one or more processors may be configured to generate, based on determining that the existing record for the file is not present in the record log, a record for the file in the record log. The one or more processors may be configured to determine, after generating the record, whether the record has been changed to identify the second region. The one or more processors may be configured to process the file based on determining that the record has not been changed to identify the second region.

Some implementations described herein relate to a method of preventing duplicative file processing. The method may include causing, by a device, duplication of a file, received at a first file storage location associated with a first region, to a second file storage location associated with a second region to enable processing of the file from one of the first file storage location or the second file storage location. The method may include determining, by the device, whether an existing record for the file is present in a record log. The method may include generating, by the device, based on determining that the existing record for the file is not present in the record log, a record for the file in the record log, where the record identifies the file and the first region. The method may include determining, by the device after generating the record, whether the record has been changed to identify the second region. The method may include processing, by the device, the file based on determining that the record has not been changed to identify the second region.

Some implementations described herein relate to a non-transitory computer-readable medium that stores a set of instructions for preventing duplicative file processing for a device. The set of instructions, when executed by one or more processors of the device, may cause the device to determine whether an existing record for a file, received at a file storage location, is present in a record log. The set of instructions, when executed by one or more processors of the device, may cause the device to generate, based on determining that the existing record for the file is not present in the record log, a record for the file in the record log. The set of instructions, when executed by one or more processors of the device, may cause the device to determine, after generating the record, whether the record has been changed to identify a second region. The set of instructions, when executed by one or more processors of the device, may cause the device to process the file based on determining that the record has not been changed to identify the second region.

DETAILED DESCRIPTION

Figure 1A:
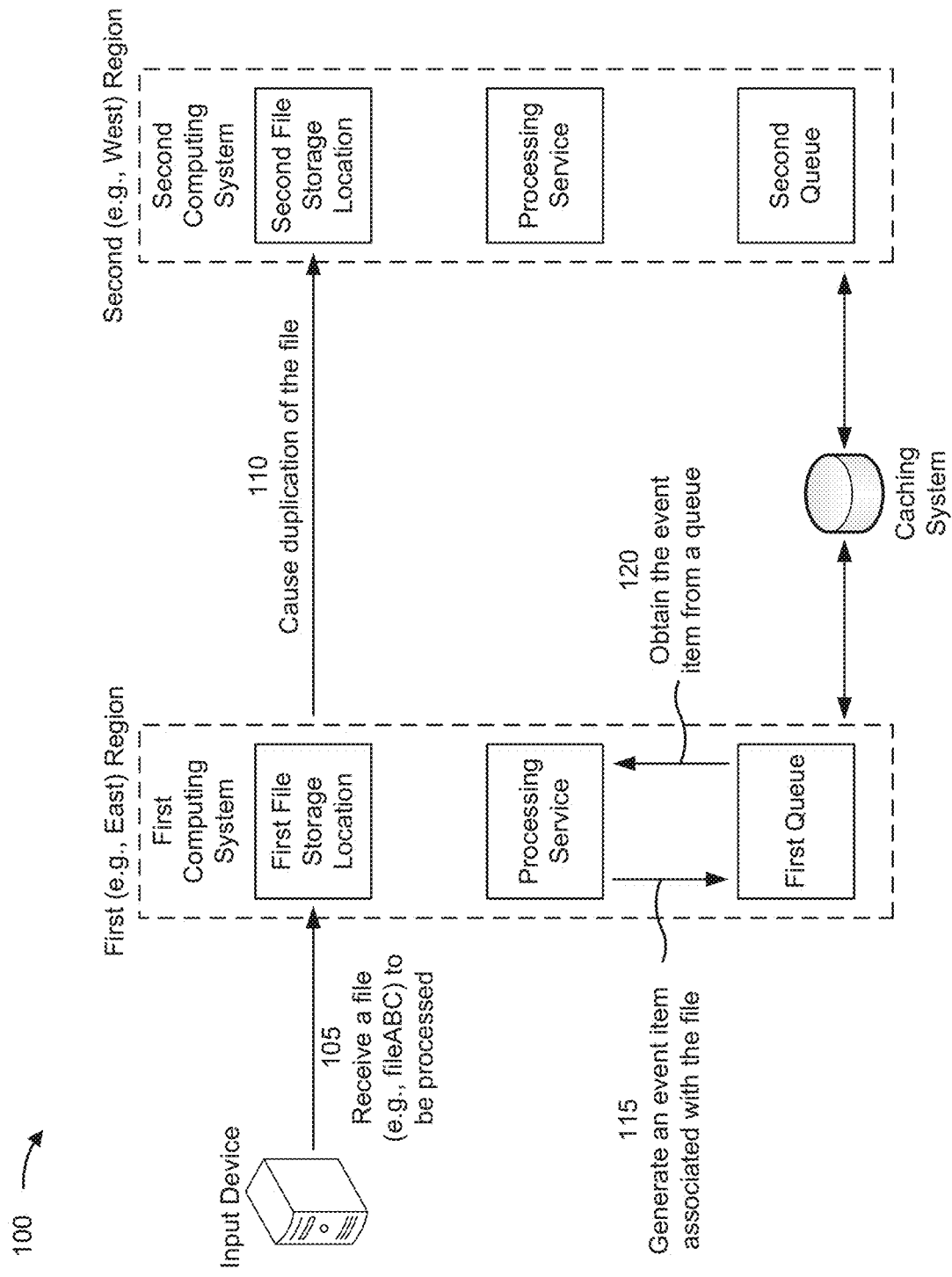
FIGS. 1A-1C are diagrams of an example implementation relating to preventing duplicative file processing.

The following detailed description of example implementations refers to the accompanying drawings. The same reference numbers in different drawings may identify the same or similar elements.

A computing system may provide automated processing of an electronic file to extract, convert, modify, or the like, data in the file. In one example, a file containing virtual transaction account identifiers for respective user accounts may be processed to generate a new file that contains the actual transaction account identifiers associated with the user accounts. The generated file may then be processed to execute transactions using the actual transaction account identifiers. In some cases, file processing in connection with a particular task may be performed at a single node, data center, computing region, or the like. However, a failure associated with the single node, data center, computing region, or the like, may result in downtime of the file processing.

In some examples, to reduce downtime caused by failure, file processing may be performed using an active-active system (e.g., a high-availability cluster). In the active-active system, file processing may be performed by multiple nodes, data centers, computing regions, or the like. The active-active system provides resiliency and failover capabilities, and thus file processing may be performed uninterrupted, or with minimal interruption, in the event of a failure associated with any one node, data center, computing region, or the like. However, file processing using an active-active system may result in duplicative file processing (e.g., the same file is processed more than once). In the example above, duplicative generation of new files containing the actual account identifiers may result in erroneously executing the same transaction multiple times. Duplicative file processing wastes computing resources associated with needlessly processing the same file multiple times. Moreover, duplicative file processing may consume excessive computing resources in connection with remediating errors caused by processing the same file multiple times.

In some implementations described herein, duplicative file processing in an active-active system may be prevented using a caching system. In some implementations, prior to processing a file, a computing system may reference a record log of the caching system to identify whether an existing record for the file is present in the record log. If no record is present, the computing system may generate a record for the file in the record log indicating that the computing system intends to process the file. Moreover, following a waiting period after generating the record, the computing system may determine whether the record has been changed to indicate that another computing system is to process the file. Such a change to the record may indicate that the other computing system indicated an intent (e.g., by generating a record) to process the file near-simultaneously with the computing system. Accordingly, the computing system may process the file based on a determination that the record has not been changed. Otherwise, the computing system may refrain from processing the file to enable the other computing system to process the file.

In this way, duplicative processing of the same file is prevented. Accordingly, computing resources that may otherwise be wasted processing the same file multiple times are conserved. Moreover, errors resulting from processing the same file multiple times may be reduced, thereby conserving computing resources that may otherwise be used remediating such errors.

Figure 1B:
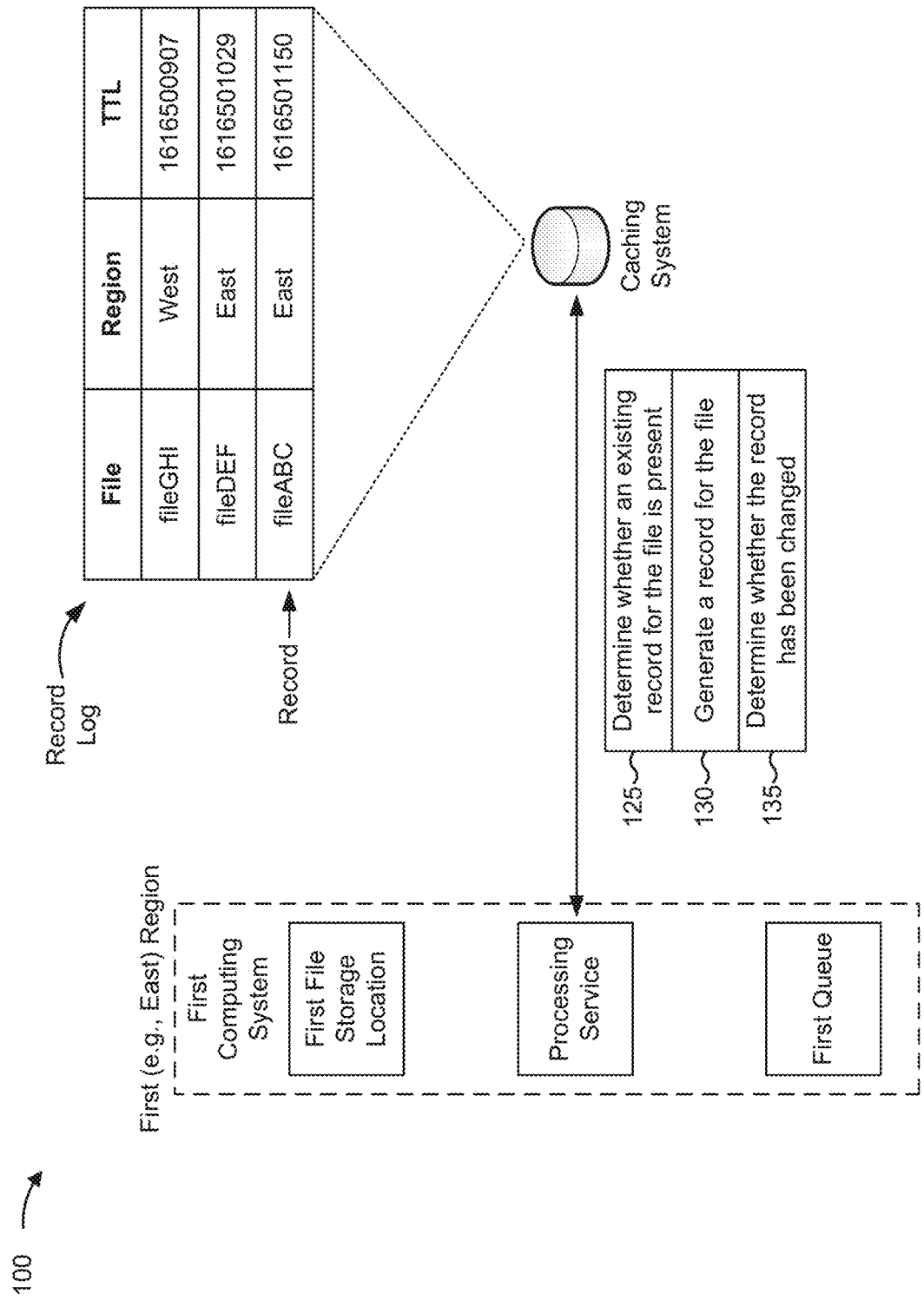
Figure 1C:
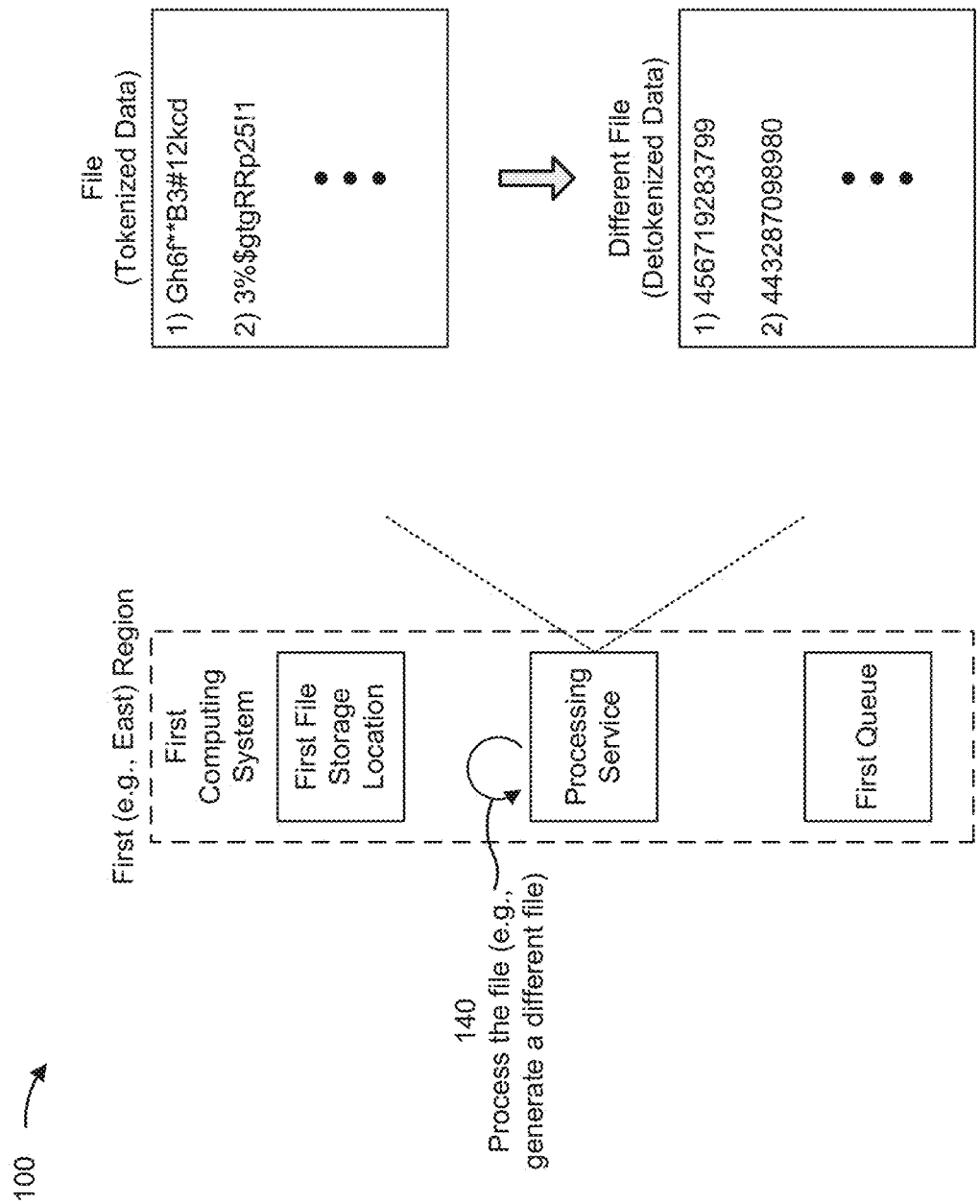

FIGS. 1A-1C are diagrams of an example 100 associated with preventing duplicative file processing (e.g., in an active-active system). As shown in FIGS. 1A-1C, example 100 includes a first computing system, a second computing system, an input device, and a caching system. These devices are described in more detail in connection with FIGS. 2 and 3.

The first computing system may be associated with a first region (e.g., a first cloud region, a first data center region, a first computing cluster, or the like), and the second computing system may be associated with a second region (e.g., a second cloud region, a second data center region, a second computing cluster, or the like). For example, the first region may be an east region (e.g., associated with an eastern area of a geographic region, such as a country) and the second region may be a west region (e.g., associated with a western area of the geographic region), the first region may be a north region and the second region may be a south region, or the like. While geographic delineations are commonly used for different regions, the first region and the second region may refer to any two computing systems (e.g., computing clusters) that use different physical devices and/ or different virtual devices. The first region and the second region may be associated with an active-active system (e.g., a high availability cluster) that includes one or more devices of the first region (e.g., the first computing system) and one or more devices of the second region (e.g., the second computing system).

The first computing system may implement a first file storage location (e.g., a first file repository), a processing service (e.g., a first instance of the processing service), and/or a first queue (e.g., a first message queue, event queue, or the like). The second computing system may implement a second file storage location (e.g., a second file repository), the processing service (e.g., a second instance of the processing service), and/or a second queue (e.g., a second message queue, event queue, or the like). The first queue and the second queue may be first-in-first-out (FIFO) queues. The processing service may include an application that is used for processing electronic files (e.g., text files, comma separated value (CSV) files, extensible markup language (XML) files, or the like). Thus, a first instance of the application, for processing files of the first file storage location, may be associated with the first region, and a second instance of the application, for processing files of the second file storage location, may be associated with the second region. In other words, the first computing system (e.g., associated with the first region) and the second computing system (e.g., associated with the second region) may implement the same service for processing files, and may perform parallel processing of files using different instances of the service (e.g., files of the first file storage location and files of the second file storage location may be processed in parallel).

The caching system may implement a record log that is used to record information indicating that a file is to be processed. For example, the record log may be a database or another data structure. The record log may be common to (e.g., shared by) the first region (e.g., the first computing system) and the second region (e.g., the second computing system). That is, the first computing system and the second computing system may both read records from and/or write records to the record log.

As shown by reference number 105, the first computing system may receive, from an input device, a file (e.g., fileABC, as shown) that is to be processed. For example, the first computing system may receive the file at the first storage location (e.g., associated with the first region). The file may be an electronic file, as described above. In some implementations, the file may include settlement data for a financial institution (e.g., end-of-day settlement data), transaction data for a financial institution, transaction data for a digital payment platform, or another type of data. In some implementations, the file may include tokenized data. For example, the file may include virtual account numbers (e.g., used in connection with a digital wallet) for one or more accounts that are to be converted to actual account numbers for the one or more accounts, to enable execution of transactions in connection with the one or more accounts.

In some implementations, the first computing system may receive the file via an upload to the first file storage location (e.g., which may be monitored by the first computing system to identify new files for processing). In some implementations, the first computing system, or another device, may receive the file via email (e.g., the first file is an email attachment) to an address that is monitored for files to be processed, and the first computing system, or the other device, may upload the file to the first storage location.

As shown by reference number 110, the first computing system (e.g., based on receiving the file at the first file storage location) may cause duplication (e.g., asynchronously) of the file to the second file storage location (e.g., associated with the second region). For example, the first computing system may upload a copy of the file to the second file storage location, may transmit the file to the second computing system, or another device, for upload to the second file storage location, may generate an email that attaches the file for transmission to the second computing system or another device (e.g., for upload to the second file storage location by a receiver of the email), or the like. Duplication of the file to the second file storage location enables processing of the file from one of the first file storage location (e.g., by the first computing system) or the second file storage location (e.g., by the second computing system). Although the description herein is in terms of the file being received at the first file storage location and duplicated to the second file storage location, the description applies equally to the file being received at the second file storage location and being duplicated to the first file storage location.

As shown by reference number 115, the first computing system (e.g., based on receiving the file at the first file storage location) may generate a first event item associated with the file. The first computing system may generate the event item in the first queue (e.g., associated with the first file storage location). The event item may include an entry, a message, or other information that provides a position in the first queue for the file. In some implementations, the first computing system may generate the event item by transmitting (e.g., to an application programming interface (API) endpoint) a message, identifying the file for processing, for inclusion in the first queue. In a similar manner, the second computing system may generate a second event item associated with the file (e.g., based on receiving the copy of the file at the second file storage location) in the second queue (e.g., associated with the second file storage location).

As shown by reference number 120, the first computing system may obtain the first event item from the first queue (e.g., when the first event item is an oldest event item in the first queue). That is, the processing service implemented by the first computing system may obtain the first event item from the first queue. The first computing system may determine, based on the first event item (e.g., based on reading the first event item), that the file is to be processed.

The first computing system (e.g., the processing service) may obtain event items from the first queue according to an order in which the event items are added to the first queue (e.g., in a FIFO manner). For example, the first computing system (e.g., the processing service) may periodically poll the first queue to obtain an oldest event item in the first queue. In some implementations, the first computing system may obtain an event item from the first queue by transmitting (e.g., to an API endpoint) a request to retrieve an event item from the first queue. In a similar manner, the second computing system may obtain the second event item from the second queue. That is, the processing service implemented by the second computing system may obtain the second event item from the second queue, in a similar manner as described above.

In some implementations, the first computing system may obtain the first event item from the first queue according to a polling interval. That is, the first computing system (e.g., the processing service) may periodically obtain event items from the first queue according to the polling interval. In some implementations, the polling interval used by the first computing system may be different from another polling interval used by the second computing system to obtain event items from the second queue. For example, the first computing system may obtain an event item from the first queue every one minute, and the second computing system may obtain an event item from the second queue everyone five minutes. In this way, there is a reduced likelihood that the first computing system and the second computing system will obtain event items, associated with the same file, from the first queue and the second queue, respectively, simultaneously or near-simultaneously.

As shown in FIG. 1B, and by reference number 125, the first computing system (e.g., based on obtaining the first event item from the first queue, and determining that the file is to be processed) may determine whether an existing record for the file is present in the record log of the caching system. For example, the first computing system (e.g., using the processing service) may query, or otherwise search, the record log for a record that identifies the file (e.g., using a file name, or another identifier). Based on determining that there is an existing record for the file present in the record log (e.g., because the second computing system previously generated the record), the first computing system may refrain from processing the file. Here, without processing the file, the first computing system may obtain a different event item from the first queue, and the first computing system may determine that a different file, indicated by the different event item, is to be processed.

As shown by reference number 130, based on determining that there is not an existing record for the file present in the record log, the first computing system (e.g., using the processing service) may generate a record for the file in the record log. A record may indicate a file (e.g., using a file name, or another identifier of the file), a region (e.g., a computing system) that is to process the file, and/or a time to live (TTL) value for the record (e.g., a future time after which the record is to be deleted). Thus, for example, the record generated by the first computing system may indicate the file (e.g., using the file name "fileABC," as shown), the first region (e.g., "East," as shown), and a TTL value. After the record is generated by the first computing system, if the second computing system (e.g., using the processing service) obtains the second event item associated with the file from the second queue, the second computing system may refrain from processing the file based on the existence of the record in the record log. In other words, existence of the record in the record log indicates that the file is to be processed only by the region indicated in the record.

As shown by reference number 135, after generating the record, the first computing system (e.g., using the processing service) may determine whether the record has been changed. For example, the first computing system may determine whether the record has been changed to identify the second region rather than the first region. Additionally, or alternatively, the first computing system may determine whether the record has been changed to identify a new TTL value. The first computing system (e.g., using the processing service) may query, or otherwise search, the record log for the record that identifies the file (e.g., using a file name, or another identifier) to determine whether the record has been changed. The first computing system may determine, after a threshold waiting period from generating the record, whether the record has been changed. For example, the threshold waiting period may be 30 seconds, one minute, or the like.

The threshold waiting period ensures that processing of the file is delayed for a sufficient duration to enable the first computing system to detect whether the second computing system also intends to process the file. For example, if the second computing system generated a record for the file simultaneously or near-simultaneously with the record for the file generated by the first computing system (e.g., a race scenario), then the record for the file may indicate the second region (e.g., if the record of the second computing system replaces the record of the first computing system). Here, after the threshold waiting period, the first computing system may obtain the record and may determine that the record has been changed. Based on determining that the record has been changed (e.g., to identify the second region rather than the first region), the first computing system (e.g., the processing service) may refrain from processing the file (e.g., and the second computing system may process the file), in a similar manner as described above. In this way, duplicative file processing may be prevented, thereby conserving computing resources that may otherwise be used for processing the same file multiple times.

As shown in FIG. 1C, and by reference number 140, based on determining that the record has not been changed (e.g., to identify the second region), the first computing system may process the file. That is, the processing service implemented by the first computing system may process the file. In some implementations, when processing the file, the first computing system may generate a new file (e.g., in a file storage location, such as a file repository, or the like). The new file may include data that is based on data in the file. For example, the file may include tokenized data, and the new file that is generated may include detokenized data. As an example, as described above, the tokenized data may include one or more virtual account identifiers that map to respective user accounts, and the detokenized data may include actual identifiers of the respective user accounts (e.g., the actual account numbers for the accounts). To process the file, the first computing system may read the tokenized data from the file, process the tokenized data (e.g., using a mapping of tokenized data to detokenized data, using a detokenizing algorithm, or the like) to obtain the detokenized data, and generate the new file using the detokenized data. Thus, the new file is generated only once, and errors resulting from duplicative file processing (e.g., errors associated with generating the new file multiple times) may be prevented, thereby conserving computing resources that may otherwise be used for remediating such errors.

In some implementations, the first computing system may perform processing of the new file that is generated. For example, the first computing system may perform validation of the data in the new file, may generate information based on the data in the new file, or the like. In some implementations, the first computing system may process, using the new file, one or more transactions (e.g., cause execution of the transactions) for the respective user accounts based on the actual identifiers in the new file. Additionally, or alternatively, the first computing system may provide the new file to another device (e.g., a storage system, a file processing system, or the like) to enable processing of the one or more transactions using the new file. In some implementations, the first computing system, based on generating the new file, may transmit a notification (e.g., to the other device) indicating that the new file has been generated.

In this way, the first computing system and the second computing system may form an active-active system for processing files without duplication. This improves the resiliency of file processing, provides failover capability, and reduces downtime. Moreover, the first computing system and the second computing system may perform file processing in parallel, thereby improving file processing speed.

In some implementations, one or more operations described herein may be implemented using one or more serverless functions. For example, the one or more operations may be implemented using a serverless container architecture.

In some implementations, receiving a file to be processed at a storage location, as described above, may trigger a serverless function that provides a request for processing of the file to an ingress point for the first region and the second region. Thus, the serverless function may be used instead of a queue described above. Moreover, the request may cause, in the first region and/or the second region, generation of an instance of a processing application (e.g., by triggering a serverless function that instantiates the processing application) that performs file processing in a similar manner as the processing service described above. For example, for each file to be processed, an instance of the processing application may be generated (e.g., in the first region or the second region) to process the file. In some implementations, an execution service for a region may determine whether a file to be processed is associated with an existing record in the record log, may generate a record in the record log, may determine whether the record has been changed after a threshold waiting period, or the like, in a similar manner as described above. Thus, the instance of the processing application, for processing a file, may be generated in a region based on a determination, by the execution service of the region, that the file is not associated with an existing record and/or that a record generated for the file has not been changed, in a similar manner as described above. For example, the execution service (e.g., using an API) may generate a processing job for the file based on a determination that the file is not associated with an existing record and/or that the record has not been changed, which may trigger generation of the instance of the processing application. After the file is processed by the processing application, the instance of the processing application may be destroyed.

In some implementations, receiving a file to be processed at a storage location, as described above, may trigger a serverless function that generates a processing job for the file. Thus, the serverless function may be used instead of a queue described above. Moreover, generation of the processing job may cause, in the first region and/or the second region, generation of an instance of a processing application (e.g., by triggering a serverless function that instantiates the processing application), as described above. In some implementations, the processing application for a region, or the serverless function, may determine whether a file to be processed is associated with an existing record in the record log, may generate a record in the record log, may determine whether the record has been changed after a threshold waiting period, or the like, in a similar manner as described above. Thus, the instance of the processing application may process a file in a region based on a determination that the file is not associated with an existing record and/or that a record generated for the file has not been changed, in a similar manner as described above. After the file is processed by the processing application, the instance of the processing application may be destroyed.

As indicated above, FIGS. 1A-1C are provided as an example. Other examples may differ from what is described with regard to FIGS. 1A-1C.

Figure 2:
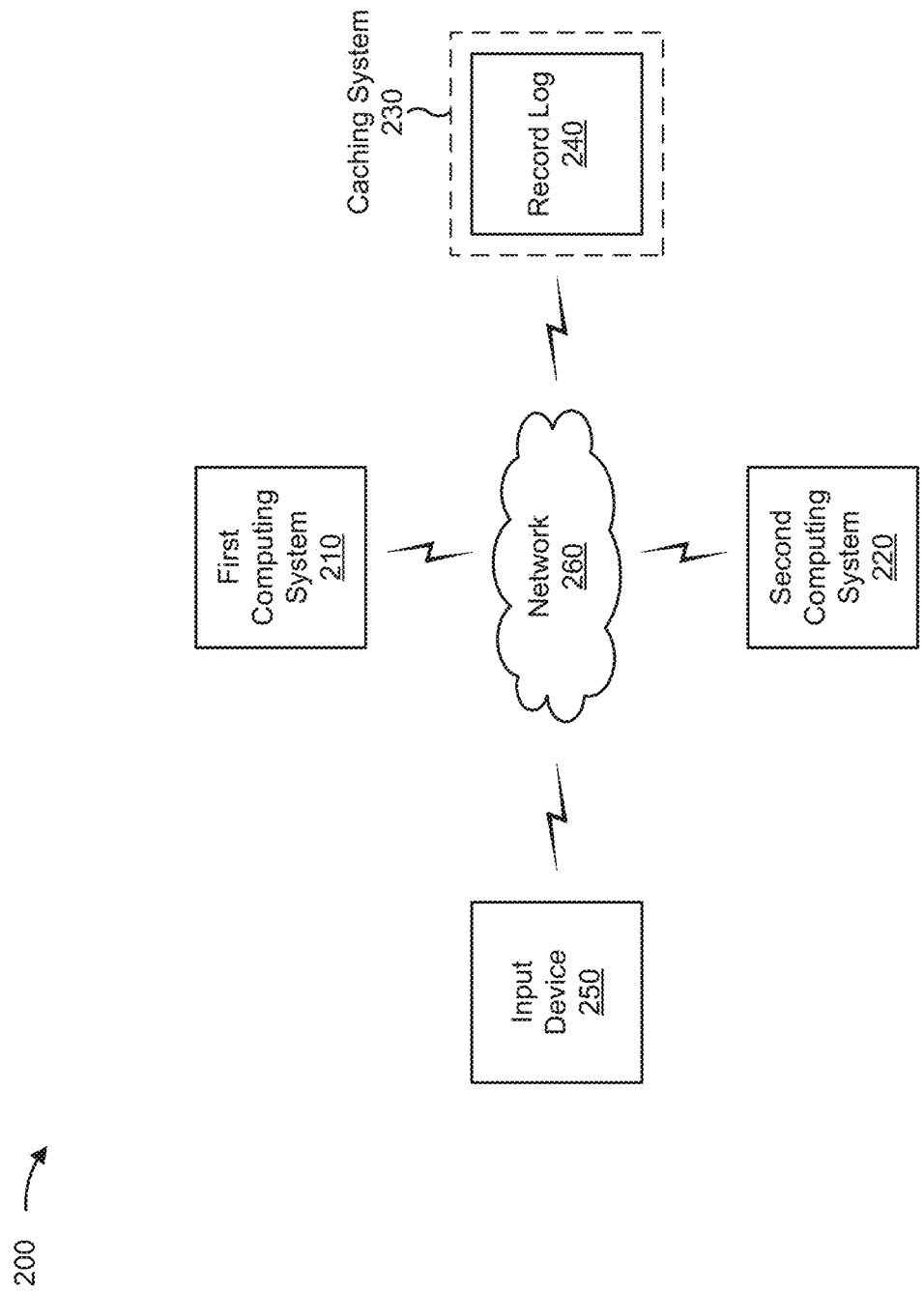
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a first computing system 210, a second computing system 220, a caching system 230 (e.g., that includes a record log 240), an input device 250, and a network 260. Devices of environment 200 may interconnect via wired connections, wireless connections, or a combination of wired and wireless connections.

The first computing system 210 includes one or more devices capable of receiving, generating, storing, processing, providing, and/or routing information associated with preventing duplicative file processing, as described elsewhere herein. The first computing system 210 may include a communication device and/or a computing device. For example, the first computing system 210 may include a server, such as an application server, a client server, a web server, a database server, a host server, a proxy server, a virtual server (e.g., executing on computing hardware), or a server in a cloud computing system. In some implementations, the first computing system 210 includes computing hardware used in a cloud computing environment. In some implementations, the first computing system 210 may include a storage system (e.g., associated with the first storage location).

The second computing system 220 includes one or more devices capable of receiving, generating, storing, processing, providing, and/or routing information associated with preventing duplicative file processing, as described elsewhere herein. The second computing system 220 may include a communication device and/or a computing device. For example, the second computing system 220 may include a server, such as an application server, a client server, a web server, a database server, a host server, a proxy server, a virtual server (e.g., executing on computing hardware), or a server in a cloud computing system. In some implementations, the second computing system 220 includes computing hardware used in a cloud computing environment. In some implementations, the second computing system 220 may include a storage system (e.g., associated with the second storage location).

The caching system 230 includes one or more devices capable of receiving, generating, storing, processing, and/or providing information associated with preventing duplicative file processing, as described elsewhere herein. The caching system 230 may include a communication device and/or a computing device. For example, the caching system 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the caching system 230 may include the record log 240 (e.g., a database). The caching system 230 may communicate with one or more other devices of environment 200, as described elsewhere herein.

The input device 250 includes one or more devices capable of generating, storing, processing, and/or providing a file that is to be processed, as described elsewhere herein. The input device 250 may include a communication device and/or a computing device. For example, the input device 250 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), a server, or a similar type of device.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
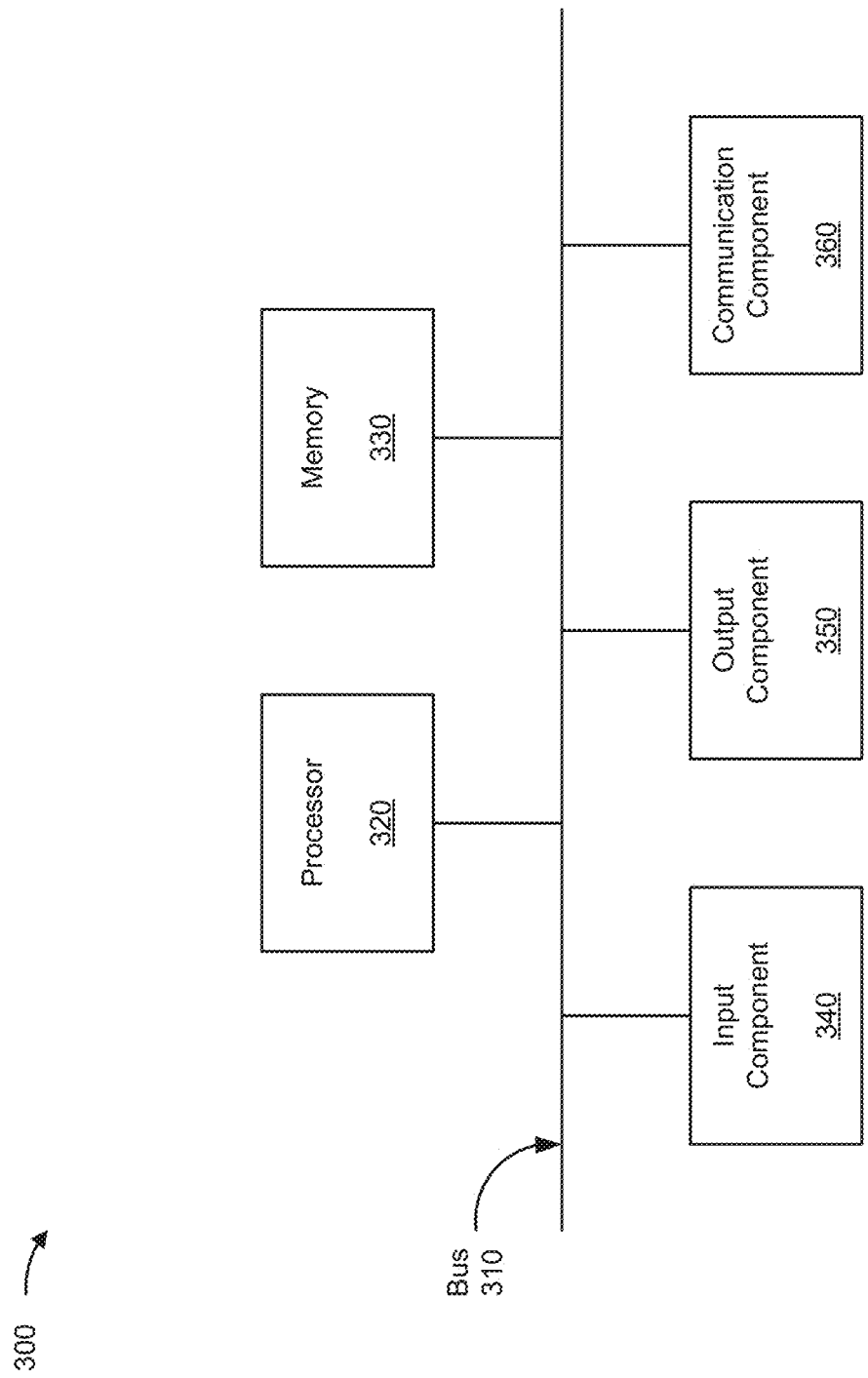
FIG. 3 is a diagram of example components of one or more devices of FIG. 2.

FIG. 3 is a diagram of example components of a device 300, which may correspond to first computing system 210, second computing system 220, caching system 230, and/or input device 250. In some implementations, first computing system 210, second computing system 220, caching system 230, and/or input device 250 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
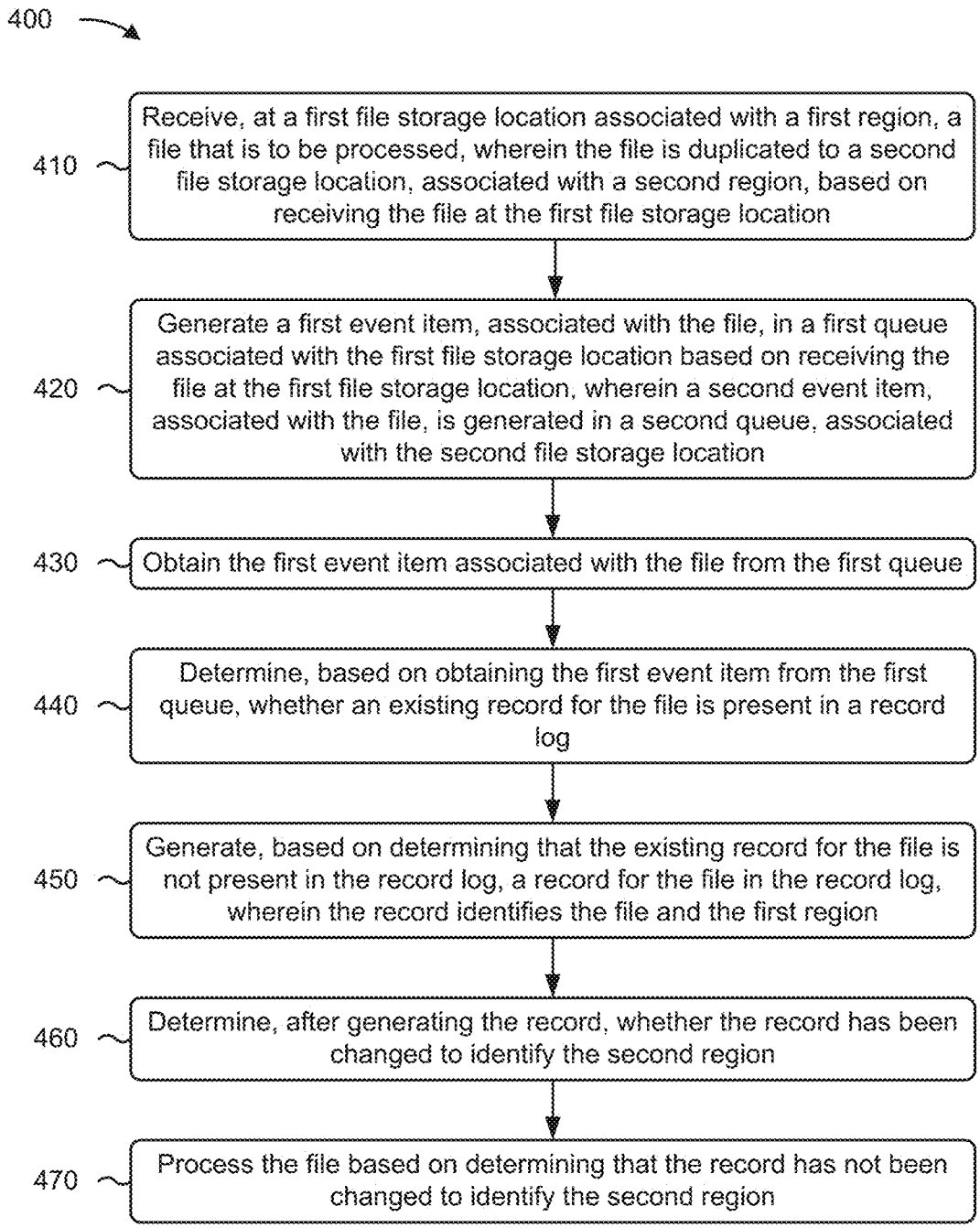
FIG. 4 is a flowchart of an example process relating to preventing duplicative file processing.

FIG. 4 is a flowchart of an example process 400 associated with preventing duplicative file processing (e.g., in an active-active system). In some implementations, one or more process blocks of FIG. 4 may be performed by a device (e.g., first computing system 210). In some implementations, one or more process blocks of FIG. 4 may be performed by another device or a group of devices separate from or including the device, such as second computing system 220, caching system 230, and/or input device 250. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, at a first file storage location associated with a first region, a file that is to be processed, wherein the file is duplicated to a second file storage location, associated with a second region, based on receiving the file at the first file storage location (block 410). As further shown in FIG. 4, process 400 may include generating a first event item, associated with the file, in a first queue associated with the first file storage location based on receiving the file at the first file storage location, wherein a second event item, associated with the file, is generated in a second queue, associated with the second file storage location (block 420). As further shown in FIG. 4, process 400 may include obtaining the first event item associated with the file from the first queue (block 430). As further shown in FIG. 4, process 400 may include determining, based on obtaining the first event item from the first queue, whether an existing record for the file is present in a record log (block 440). As further shown in FIG. 4, process 400 may include generating, based on determining that the existing record for the file is not present in the record log, a record for the file in the record log, wherein the record identifies the file and the first region (block 450). As further shown in FIG. 4, process 400 may include determining, after generating the record, whether the record has been changed to identify the second region (block 460). As further shown in FIG. 4, process 400 may include processing the file based on determining that the record has not been changed to identify the second region (block 470).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions for preventing duplicative file processing, the set of instructions comprising:
   one or more instructions that, when executed by one or more processors of a device, cause the device to:

obtain, based on a first polling interval, a first event item associated with a file based on receiving the file at a first file storage location,
   wherein the first polling interval is a particular amount of time that the device waits to obtain the first event item,
   wherein second polling interval is a different amount of time that another device, associated with a second file storage location, waits to obtain the first event item, and
   wherein the first polling interval and the second polling interval periodically obtain event items, wherein the first event item is part of the event items;
query a record log for a record for the file,
   wherein the record identifies the file and the first file storage location;
determine that the record has been changed for the file to indicate the second file storage location; and
refrain from processing the file based on determining that the record has been changed,
   wherein the one or more instructions, that cause the device to refrain from processing the file, cause the device to:
      refrain from processing the file based on determining that the record has been changed to identify a new time to live value; or
      refrain from processing the file based on determining that the record is associated with the second file storage location.

2. The non-transitory computer-readable medium of claim 1, wherein the record log identifies the file using one or more of:
   a file name, or
   a file identifier.

3. The non-transitory computer-readable medium of claim 1, wherein the one or more instructions, that cause the device to process the file, cause the device to:
   generate a new file that includes detokenized data that is based on tokenized data included in the file.

4. The non-transitory computer-readable medium of claim 1, wherein the one or more instructions, when executed by the one or more processors, further cause the device to:
   generate an event item, associated with the file, in a queue associated with the first file storage location based on receiving the file at the first file storage location; and
   obtain the event item associated with the file from the queue when the event item is an oldest event item in the queue.

5. The non-transitory computer-readable medium of claim 1, wherein a first instance of an application for processing files of the first file storage location is associated with a first region, and a second instance of the application for processing files of the second file storage location is associated with a second region.

6. The non-transitory computer-readable medium of claim 1, wherein files of the first file storage location and files of the second file storage location are processed in parallel.

7. A system for preventing duplicative file processing, the system comprising:
   one or more memories; and
   one or more processors, communicatively coupled to the one or more memories in a device, configured to:
      obtain, based on a first polling interval, a first event item associated with a file based on receiving the file at a first file storage location,
         wherein the first polling interval is a particular amount of time that the device waits to obtain the first event item,
         wherein a second polling interval is a different amount of time that another device, associated with a second file storage location, waits to obtain the first event item, and
         wherein the first polling interval and the second polling interval periodically obtain event items, wherein the first event item is part of the event items;
      query a record log for a record for the file;
         wherein the record identifies the file and the first file storage location;
      determine that the record has been changed for the file to indicate the second file storage location; and
      refrain from processing the file based on determining that the record has changed,
         wherein the one or more processors, when refraining from processing the file, are to:
            refrain from processing the file based on determining that the record has been changed to identify a new time to live value, or
            refrain from processing the file based on determining that the record is associated with the second file storage location.

8. The system of claim 7, wherein the record log for the record identifies the file using a file identifier.

9. The system of claim 7, wherein the one or more processors to process the file, are to:
   generate a new file that includes detokenized data that is based on tokenized data included in the file.

10. The system of claim 7, wherein the one or more processors, are further to:
   generate an event item, associated with the file, in a queue associated with the first file storage location based on receiving the file at the first file storage location; and
   obtain the event item associated with the file from the queue when the event item is an oldest event item in the queue.

11. The system of claim 7, wherein a first instance of an application for processing files of the first file storage location is associated with a first region, and a second instance of the application for processing files of the second file storage location is associated with a second region.

12. The system of claim 7, wherein files of the first file storage location and files of the second file storage location are processed in parallel.

13. The system of claim 7, wherein the one or more processors are further to:
   cause duplication of the file, received at the first file storage location, to the second file storage location to enable processing of the file from one of the first file storage location or the second file storage location.

14. A method comprising:
   obtaining, by a device and based on a first polling interval, a first event item associated with a file based on receiving the file at a first storage location,
      wherein the first polling interval is a particular amount of time that the device waits to obtain the first event item,
      wherein a second polling interval is a different amount of time that a different another device, associated with a second storage location, waits to obtain the first event item, and wherein the first polling interval and the second polling interval periodically obtain event items, wherein the first event item is part of the event items;

querying, by the device, a record log for a record for the file;

wherein the record identifies the file and the first storage location;

determining, by the device, that the record has been changed for the file to indicate the second storage location; and refraining, by the device, from processing the file based on determining that the record has changed, and wherein refraining from processing the file comprises:

refraining from processing the file based on determining that the record has been changed to identify a new time to live value; or refraining from processing the file based on determining that the record is associated with the second storage location.

15. The method of claim 14, wherein the record log for the record identifies the file using a file identifier.

16. The method of claim 14, wherein processing the file comprises:

generating a new file that includes detokenized data that is based on tokenized data included in the file.

17. The method of claim 14, further comprising:

generating an event item, associated with the file, in a queue associated with the first storage location based on receiving the file at the first storage location; and obtaining the event item associated with the file from the queue when the event item is an oldest event item in the queue.

18. The method of claim 14, wherein a first instance of an application for processing files of the first storage location is associated with a first region, and a second instance of the application for processing files of the second storage location is associated with a second region.

19. The method of claim 14, wherein files of the first storage location and files of the second storage location are processed in parallel.

20. The method of claim 14, further comprising:

causing duplication of the file, received at the first storage location, to the second storage location to enable processing of the file from one of the first storage location or the second storage location.

\* \* \* \* \*